United States Patent [19]

Venia

[11] Patent Number: 5,630,247
[45] Date of Patent: May 20, 1997

[54] LEAF COLLECTION BOX WITH DUST RECIRCULATION

[76] Inventor: Steven P. Venia, 6633 Tennyson, Ottawa Lake, Mich. 49267

[21] Appl. No.: 523,141

[22] Filed: Sep. 5, 1995

[51] Int. Cl.[6] ................................................ E01H 1/08
[52] U.S. Cl. ...................... 15/347; 15/340.1; 15/346
[58] Field of Search .................... 15/340.1, 340.3, 15/340.4, 347, 346

[56] References Cited

U.S. PATENT DOCUMENTS

| | | |
|---|---|---|
| 3,744,653 | 7/1973 | Jensen .................................. 15/347 X |
| 4,006,511 | 2/1977 | Larsen .................................. 15/346 X |
| 4,660,248 | 4/1987 | Young .................................. 15/346 X |
| 5,181,294 | 1/1993 | Campbell et al. . |
| 5,317,783 | 6/1994 | Williamson ......................... 15/347 X |

OTHER PUBLICATIONS

American Road Machinery brochure dated Jul., 1992.
Gledhill Trailer Mounted Vacuum Leaf Loaders flyer (undated).
Gledhill Self Contained Vacuum Leaf Loaders flyer (undated).
Gledhill Leaf Loaders flyer (undated).
Groundskeepers Quality, Powered Yard Waste Removal Systems flyer (undated).

*Primary Examiner*—Chris K. Moore
*Attorney, Agent, or Firm*—MacMillan, Sobanski & Todd

[57] ABSTRACT

A leaf collection apparatus includes a vacuum generating apparatus for collecting leaves. An enclosure for holding leaves is connected to the vacuum generating apparatus. The enclosure includes a screened opening. A dust shroud is connected to the enclosure and covers the screened opening. A recirculating means connects the dust shroud to the vacuum generating apparatus. Leaf dust is removed from the dust shroud and recirculated to the vacuum generating apparatus. The preferred enclosure is a leaf collection box including a screened opening in the top wall and a screened opening in the rear wall. Preferably the vacuum generating apparatus including a fan inside a housing.

18 Claims, 5 Drawing Sheets

LEAF COLLECTION BOX WITH DUST RECIRCULATION

BACKGROUND OF THE INVENTION

This invention relates in general to leaf collection machines and in particular to an improved structure for a leaf collection box adapted for use with a vacuum operated leaf collection machine.

A typical leaf collection machine includes a vacuum generating apparatus which sucks up leaves lying on the ground and blows them into a large leaf collection box. Usually, the vacuum generating apparatus includes a large diameter fan contained within a fan housing, a gas or diesel engine for rotating the fan, an intake hose connected to one side of the fan housing for sucking in the leaves, and a discharge tube connected to another side of the fan housing for blowing the leaves into the leaf collection box. The leaf collection box is often mounted on a flat bed of a dump truck, and the vacuum generating apparatus is pulled behind the truck. In operation, the engine rotates the fan so as to create an air flow up to 24,000 cubic feet per minute or more. The leaves are sucked through the intake hose into the fan housing and out through the discharge tube into the leaf collection box.

A standard leaf collection box includes a steel frame having solid sides, a solid top, and a solid bottom. However, at least one opening is usually formed through the side or the top of a standard leaf collection box to vent the interior thereof to the atmosphere. This opening is usually covered by a mesh screen to prevent leaves from exiting the leaf collection box with the vented air. Unfortunately, it has been found that relatively large amounts of dust and small particulates are not trapped by the mesh screen and, therefore, are blown into the atmosphere around the leaf collection apparatus. This is particularly true when the leaves being collected are very dry and tend to break up into small pieces when drawn through the fan. This leaf dust blows out of the leaf collection box onto the crew operating the intake hose and raking the leaves, causing difficulties in vision and breathing. It can also impair the vision of passing motorists and affect pedestrians walking nearby. Additionally, the leaf dust can plug the air intakes for the engines of the leaf collection apparatus and the vehicle pulling it, and can cause a fire by landing on hot components of the leaf collection apparatus. Accordingly, it would be desirable to provide an improved structure for a leaf collection machine which reduces the amount of dust and small particulates which are blown into the atmosphere around the leaf collection apparatus during use.

SUMMARY OF THE INVENTION

This invention relates to an improved leaf collection apparatus. The leaf collection apparatus includes a vacuum generating apparatus for collecting leaves. An enclosure for holding leaves is connected to the vacuum generating apparatus. The enclosure includes a screened opening. A dust shroud is connected to the enclosure and covers the screened opening. A recirculating means connects the dust shroud to the vacuum generating apparatus. Leaf dust is removed from the dust shroud and recirculated to the vacuum generating apparatus. The preferred enclosure is a leaf collection box including a screened opening in the top wall and a screened opening in the rear wall. Preferably the vacuum generating apparatus includes a fan inside a housing.

The leaf collection apparatus solves the problems caused by excessive dust, by recirculating the dust back through the fan housing into the load of leaves in the leaf box. As the leaf box fills up with leaves, less and less dust escapes. Recirculation of the leaf dust keeps it contained within the leaf collection apparatus instead of escaping into the surrounding area. Thus the problems associated with leaf dust blowing onto operators, passersby and equipment are avoided. It is seen that the present invention creates a safer operation by using existing suction created by the leaf machine, in a simple way without requiring any extra moving parts. This invention could be adapted to any vacuum leaf machine.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
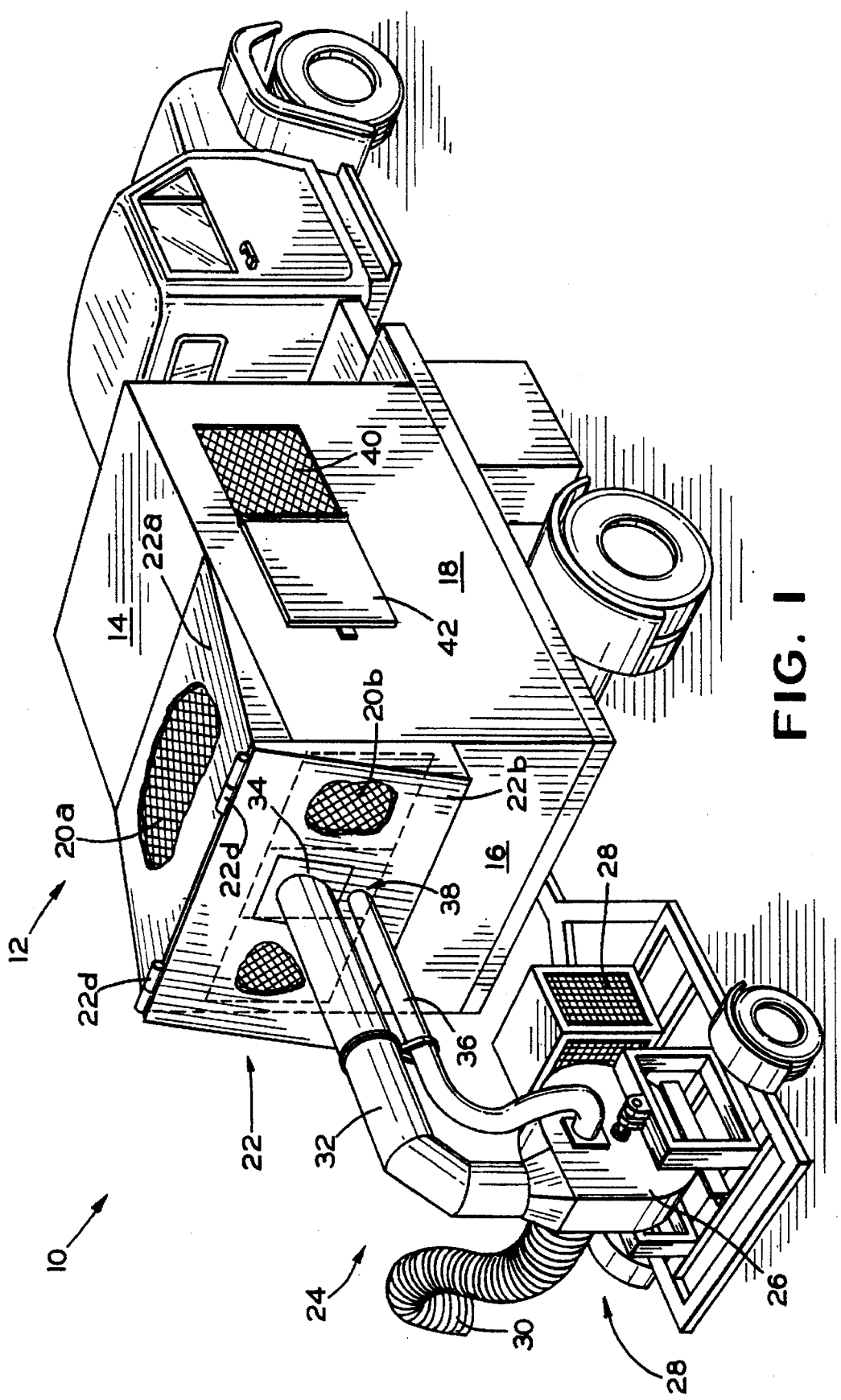
FIG. 1 is a perspective view of a leaf collection apparatus including a leaf collection box in accordance with this invention.

Referring now to the drawings, there is illustrated in FIG. 1 a first embodiment of a leaf collection apparatus, indicated generally at 10, in accordance with this invention. The leaf collection apparatus 10 includes an enclosure for holding and transporting leaves which are collected. In the illustrated embodiment, the enclosure is a leaf collection box 12. The leaf collection box 12 can be any size and shape suitable for holding leaves and formed from any suitable material, such as metal or plastic. As shown in FIG. 1, the leaf collection box 12 includes a steel frame having six walls which form an enclosure. The leaf collection box 12 includes a top wall or roof 14, a rear wall or tailgate 16, and two side walls 18 (only one of which is shown). The leaf collection box 12 also includes a front wall and a bottom wall, neither of which is shown. The illustrated leaf collection box 12 is shown as being supported on a flat bed of a standard dump truck.

The leaf collection box 12 further includes a screened opening provided in at least one of the walls. Preferably two such screened openings 20a and 20b are provided, as shown in FIG. 1. The screened openings 20a and 20b can be of any size and shape suitable for allowing passage of leaf dust and air from the leaf collection box, while retaining most of the whole leaves and large particles therein. The screened openings 20a and 20b are preferably formed from steel mesh, but could also be expanded metal, framed wire, plastic mesh, or other types of screens. Preferably, the mesh size of the screens provides openings of about ¼–½ inch by about ¾–1 inch, and more preferably about ¼ inch by about ¾ inch, although other sizes can also be used. While the screened openings 20a and 20b shown in FIG. 1 are rectangular in shape, they could also be square, circular, or other shapes. When the screened openings 20a and 20b are provided in two walls of the leaf collection box 12, they preferably comprise between about 25% to about 45% of the surface area of the two walls.

In the embodiment shown in FIG. 1, the first screened opening 20a is provided in the top wall 14, while the second screened opening 20b is provided in the rear wall 16. More specifically, the top screened opening 20a is positioned in the rear portion of the top wall 14, and the rear screened opening 20b is positioned in the top portion of the rear wall 16. The rear screened opening 20b shown in FIG. 1 is divided into two side sections, located on opposite sides of the leaf collection box 12.

The leaf collection apparatus 10 further includes a dust shroud, indicated generally at 22, which is connected to the upper rear portion of the leaf collection box 12. The dust shroud 22 includes a top shroud portion 22a, which covers the top screened opening 20a, and a rear shroud portion 22b, which covers the rear screened opening 20b. The dust shroud 22 can be formed of any convenient material, such as sheet metal steel. The dust shroud portions 22a and 22b are preferably interconnected so that leaf dust can be passed from one area into the other for recirculation. Preferably, the shroud portions 22a and 22b are also hinged together, as shown at 22d in FIGS. 1 and 2, to allow them to be opened and closed over the screened openings 20a and 20b. If desired, the screened openings 20a and 20b can also be hinged (not shown). Such hinged connections permit easy cleaning of the shroud portions and screens between leaf collection operations.

The leaf collection apparatus 10 further includes a vacuum generating apparatus, indicated generally at 24, for sucking leaves off of the ground and blowing them into the leaf collection box 12. The vacuum generating apparatus 24 includes a large diameter fan (not shown) which is contained within a fan housing 26. The fan usually includes generally paddle-shaped blades with one face of the blade oriented in the direction of rotation of the fan. In the illustrated embodiment, this creates a vacuum inside the fan housing 26 by blowing air outside the fan housing, such as through the discharge tube 32 discussed below. Any means, such as a gas or diesel engine contained within an engine housing 28 can be provided for rotating the fan within the fan housing 26. A flexible intake hose 30 is connected to one side of the fan housing 26 for sucking in the leaves off of the ground and into the fan housing 26 when the fan is rotated. The structures of leaf collection intake hoses and related control mechanisms are disclosed in U.S. Pat. No. 5,181,294, issued Jan. 26, 1993, and the disclosure of that patent is incorporated herein by reference.

Figure 2:
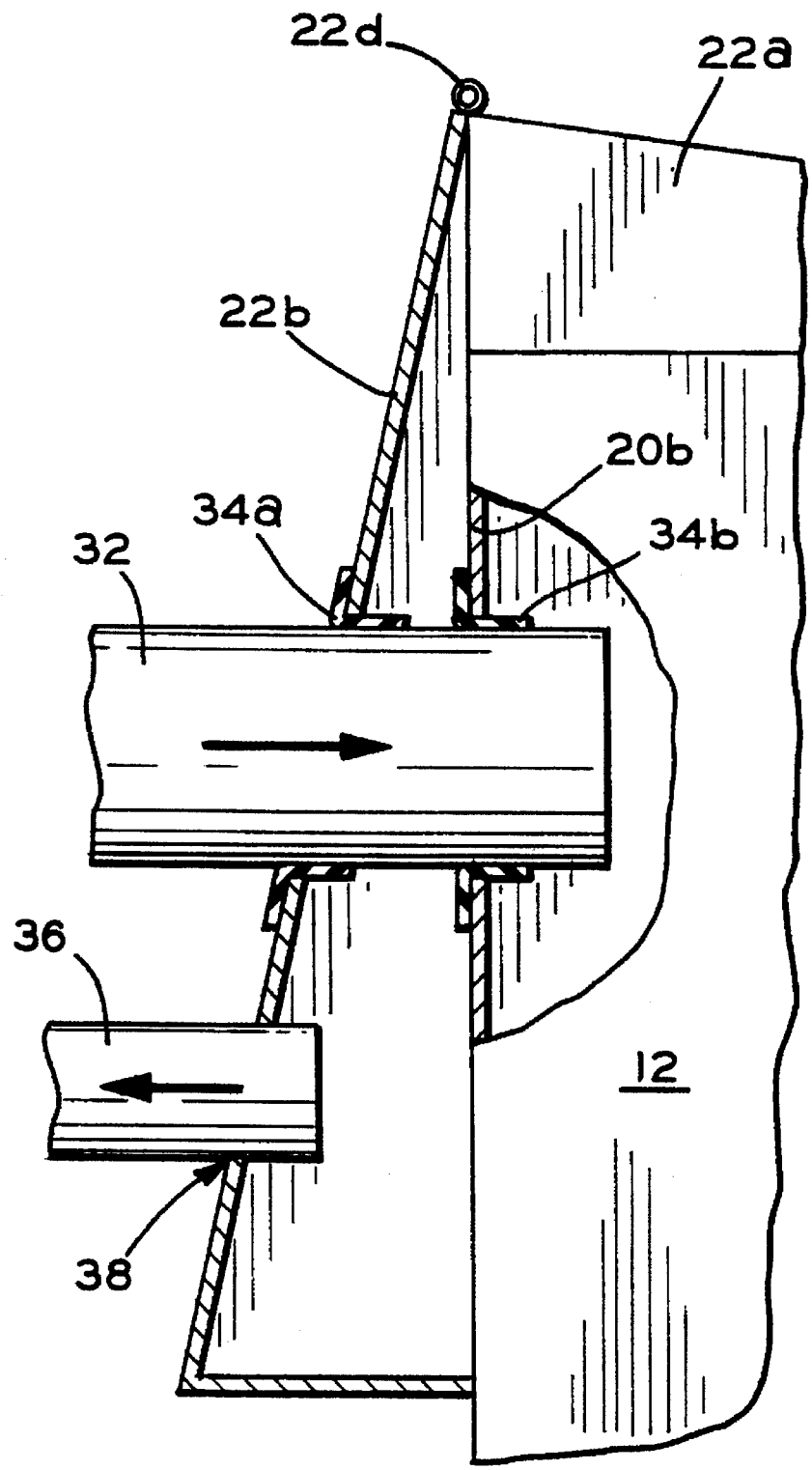
FIG. 2 is a sectional elevational view of the rear wall and rear shroud portion of the leaf collection box of FIG. 1.

A discharge tube 32 is connected to another side of the fan housing 26 for blowing the leaves out of the fan housing 26 and into the leaf collection box 12. In the preferred embodiment of FIG. 1, one end of the discharge tube 32 is connected to the top of the fan housing 26. The other end of the discharge tube 32 extends into the leaf collection box 12. As best shown in FIG. 2, the discharge tube 32 extends through a first rubber boot 34a provided in an apeme formed through the center of the rear shroud portion 22b and through a second rubber boot 34b provided in an aperture formed through the rear screened opening 20b. An arrow indicates the direction of the leaves through the discharge tube 32.

In practice, the engine rotates the fan and the leaves are sucked through the intake hose 30 into the fan housing 26, and from the fan housing 26 through the discharge tube 32 into the leaf collection box 12. A preferred air flow inside the fan housing 26 is between about 18,000 and about 24,000 cubic feet per minute.

A recirculating means is provided for minimizing the amount of the leaf dust which is vented out of the leaf collection box 12 during operation. In the embodiment illustrated in FIGS. 1 and 2, this recirculating means includes a dust collection hose 36 which is connected to and extends from an outlet 38 formed in the rear dust shroud 22b to the fan housing 26. The outlet 38 is an aperture through the rear shroud portion 22b which sealingly accommodates the dust collection hose 36. It is preferably located near the bottom center of the rear shroud portion 22b, as shown in FIGS. 1 and 2. FIG. 2 clearly shows the dust collection hose 36 connected to the outlet 38 in the rear shroud portion 22b. An arrow indicates the direction of the dust through the dust collection hose 36. The dust collection hose 36 can be of any suitable size, but typically a 4-inch or 6-inch diameter flexible hose is used. The dust collection hose 36 preferably enters the fan housing 26 on the side opposite the intake hose 30. The dust collection hose 36 utilizes the large amount of vacuum created by the rotation of the fan blade within the fan housing 26 to draw leaf dust out of the area covered by the dust shroud 22 into the fan housing 26. A damper, not shown, can be provided on the side of the fan housing 26 or in the dust collection hose 36 to control the amount of air which is drawn through the dust collection hose 36.

In operation, the suction or negative pressure created by the rotation of the fan blade within the fan housing 26 draws the leaves and other materials through the intake hose 30 into the fan housing 26. From there, the leaves are blown through the discharge tube 32 into the leaf collection box 12. Air which is vented from the leaf collection box 12 (carrying dust and other small particulates) exits through the top and rear screened openings 20a and 20b and enters into the areas defined by the dust shroud 22. Some of such vented air is drawn back through the dust collection hose 36 into the fan housing 26, where it is mixed with the leaves being sucked in through the intake hose 30. This dust is thus recirculated back through the discharge tube 32 into the leaf collection box 12. Thus, the leaf collection apparatus 10 does not filter out the dust, but simply recirculates it back through the leaf collection box 12. Nonetheless, the leaf collection apparatus 10 reduces the amount of such dust which is vented into the atmosphere.

The leaf collection box 12 illustrated in FIG. 1 also includes means for viewing the interior of the leaf collection box 12 to determine the quantity of leaves which have been collected. Preferably, this viewing means includes a third screened opening 40 provided in the side wall 18 of the leaf collection box 12, as shown in FIG. 1. The screened opening 40 is covered by a hinged door 42 which is closed during operation.

Figure 3:
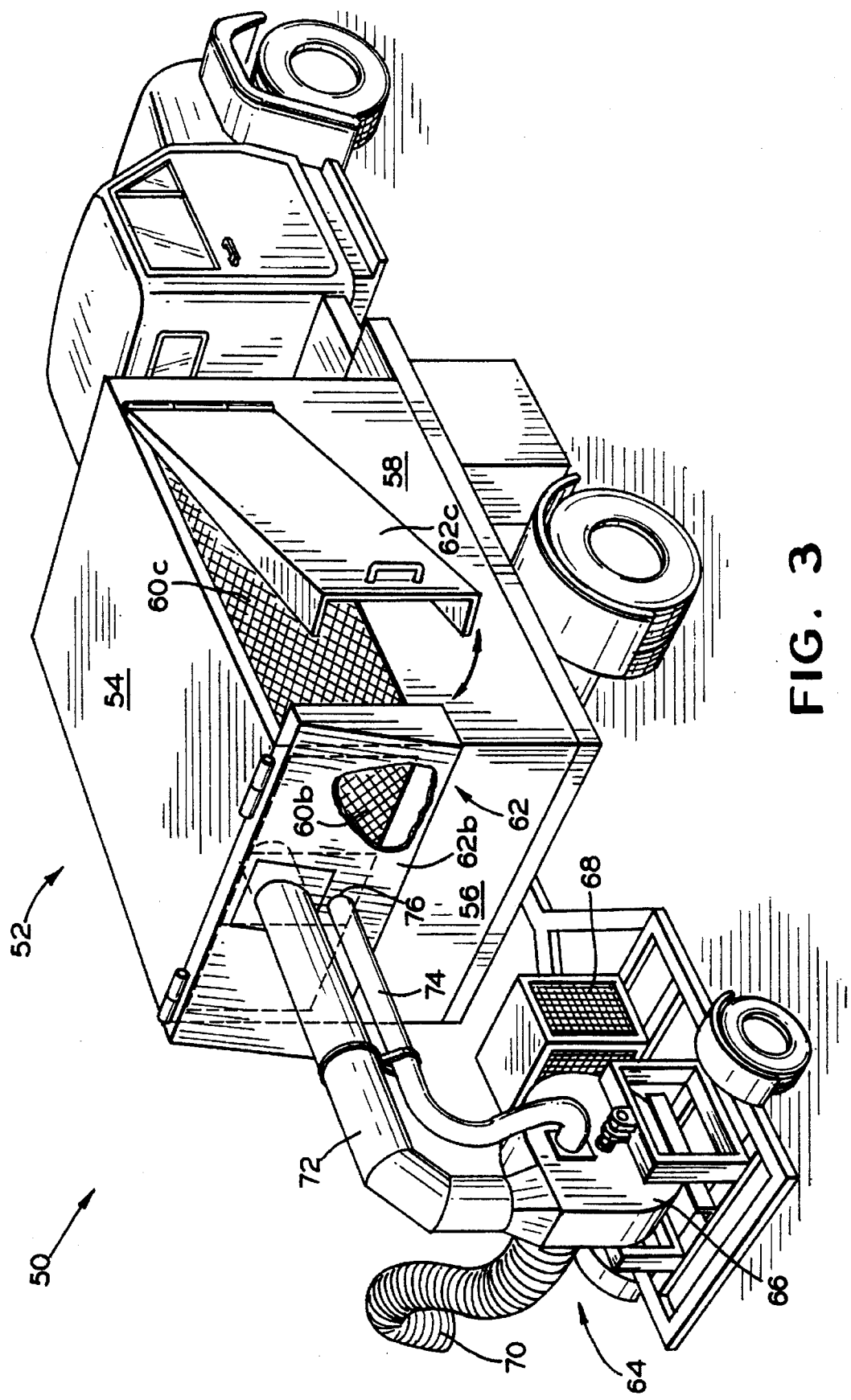
FIG. 3 is a perspective view of a second embodiment of a leaf collection apparatus including a leaf collection box in accordance with this invention.

FIG. 3 illustrates a second embodiment of a leaf collection apparatus, indicated generally at 50, in accordance with this invention. The leaf collection apparatus 50 includes a leaf collection box 52 for holding and transporting leaves which are collected. The leaf collection box 52 includes a top wall 54, a rear wall 56, and two side walls 58 (only one of which is shown). The leaf collection box 52 also includes a front wall and a bottom wall, neither of which is shown. The illustrated leaf collection box 52 is shown as being supported on a flat bed of a standard dump track.

The leaf collection box 52 further includes two screened openings 60b and 60c for allowing passage of leaf dust and air from the leaf collection box 52, while retaining most of the whole leaves and large particles therein. In the embodiment shown in FIG. 3, the first screened opening 60b is provided in the rear wall 56. However, there is no second screened opening provided in the top wall as in the embodiment of FIG. 1. Rather, the second screened opening 60c is provided in a side wall 58. More specifically, the rear screened opening 60b is positioned in the top portion of the rear wall 56, and the side screened opening 60c is positioned in the top portion of the side wall 58 of the leaf collection box 52. The rear screened opening 60b shown in FIG. 3 is divided into two side sections, located on opposite sides of the leaf collection box 52. The side screened opening 60c also functions as a viewing means for determining the quantity of leaves which have been collected.

The leaf collection apparatus 50 further includes a dust shroud, indicated generally at 62. The dust shroud 62 includes a rear shroud portion 62b, which covers the rear screened opening 60b, and a side shroud portion 62c, which covers the side screened opening 60c. The side shroud portion 62c is hinged near the front of the leaf collection box 52 to allow opening and closing over the side screened opening 60c. When closed, the side shroud portion 62c is interconnected with the rear shroud portion 62b so that leaf dust can be passed from one area into the other for recirculation.

The leaf collection apparatus 50 further includes a vacuum generating apparatus, indicated generally at 64, for sucking leaves off of the ground and blowing them into the leaf collection box 52. The vacuum generating apparatus 64 includes a large diameter fan (not shown) which is contained within a fan housing 66. An engine contained within an engine housing 68 is provided for rotating the fan within the fan housing 66. A flexible intake hose 70 is connected to one side of the fan housing 66 for sucking in the leaves off of the ground and into the fan housing 66 when the fan is rotated.

A discharge tube 72 is connected to another side of the fan housing 66 for blowing the leaves out of the fan housing 66 and into the leaf collection box 52. In the embodiment of FIG. 3, one end of the discharge tube 72 is connected to the top of the fan housing 66. The other end of the discharge tube 72 extends into the leaf collection box 52. In practice, the engine rotates the fan and the leaves are sucked through the intake hose 70 into the fan housing 66, and from the fan housing 66 through the discharge tube 72 into the leaf collection box 52.

A recirculating means is provided for minimizing the amount of the leaf dust which is vented out of the leaf collection box 52 during operation. In the embodiment illustrated in FIG. 3, this recirculating means includes a dust collection hose 74 which extends from an outlet 76 formed in the rear shroud portion 62b to the fan housing 66. The outlet 76 is an aperture through the rear shroud portion 62b which sealingly accommodates the dust collection hose 74. It is preferably located near the bottom center of the rear shroud portion 62b, as shown in FIG. 3. The dust collection hose 74 preferably enters the fan housing 66 on the side opposite the intake hose 70. The dust collection hose 74 utilizes the large amount of vacuum created by the rotation of the fan blade within the fan housing 66 to draw leaf dust out of the area covered by the dust shroud 62 into the fan housing 66.

In operation, the suction or negative pressure created by the rotation of the fan blade within the fan housing 66 draws the leaves and other materials through the intake hose 70 into the fan housing 66. From there, the leaves are blown through the discharge tube 72 into the leaf collection box 52.

Air which is vented from the leaf collection box 52 (carrying dust and other small particulates) exits through the rear and side screened openings 60b and 60c and enters into the areas defined by the dust shroud 62. Some of such vented air is drawn back through the dust collection hose 74 into the fan housing 66, where it is mixed with the leaves being sucked in through the intake hose 70. This dust is thus recirculated back through the discharge tube 72 into the leaf collection box 52.

Figure 4:
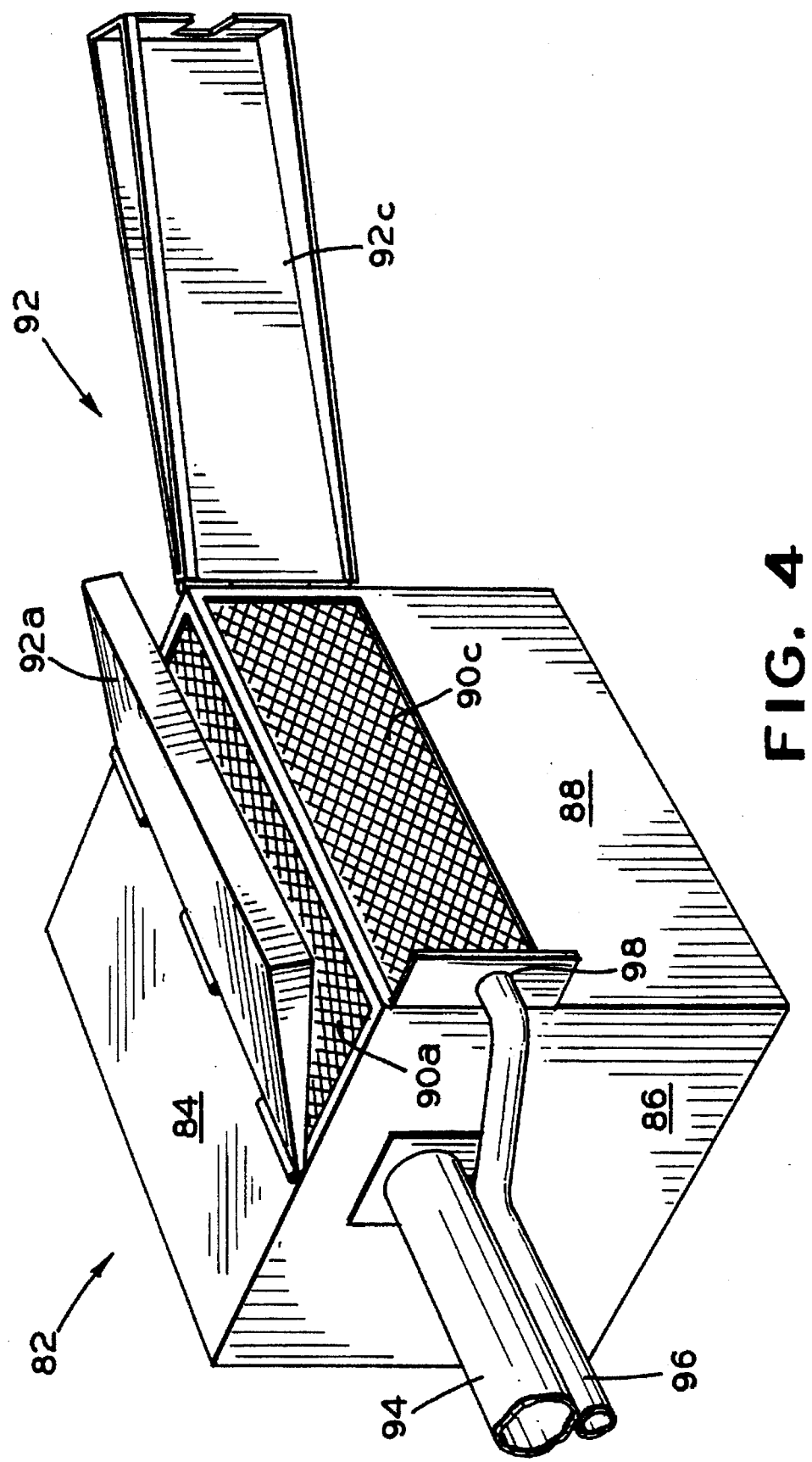
FIG. 4 is a perspective view of a third embodiment of the leaf collection box in accordance with this invention.

FIG. 4 illustrates a third embodiment of a leaf collection box, indicated generally at 82, in accordance with this invention. The leaf collection box 82 includes a top wall 84, a rear wall 86, and two side walls 88 (only one of which is shown). The leaf collection box 82 also includes a front wall and a bottom wall, neither of which is shown.

The leaf collection box 82 further includes two screened openings 90a and 90c for allowing passage of leaf dust and air from the leaf collection box 82, while retaining most of the whole leaves and large particles therein. In the embodiment shown in FIG. 4, the first screened opening 90a is provided in the top wall 84. However, there is no second screened opening provided in the rear wall as in the embodiment of FIG. 1. Rather, the second screened opening 90c is provided in a side wall 88. More specifically, the top screened opening 90a is positioned in a side portion of the top wall 84, and the side screened opening 90c is positioned in the top portion of the side wall 88 of the leaf collection box 82.

A dust shroud is indicated generally at 92. The dust shroud 92 includes a top shroud portion 92a, which covers the top screened opening 90a, and a side shroud portion 92c, which covers the side screened opening 90c. The side shroud portion 92c is hinged near the front of the leaf collection box 82 to allow opening and closing over the side screened opening 90c. When closed, the side shroud portion 92c is interconnected with the top shroud portion 92a so that leaf dust can be passed from one area into the other for recirculation.

A discharge tube 94 as described above extends into the leaf collection box 82. A dust collection hose 96 extends from an outlet 98 formed in the side shroud portion 92c. The leaf collection box 82 functions to recirculate leaf dust in the manner described above for the first and second embodiments.

Figure 5:
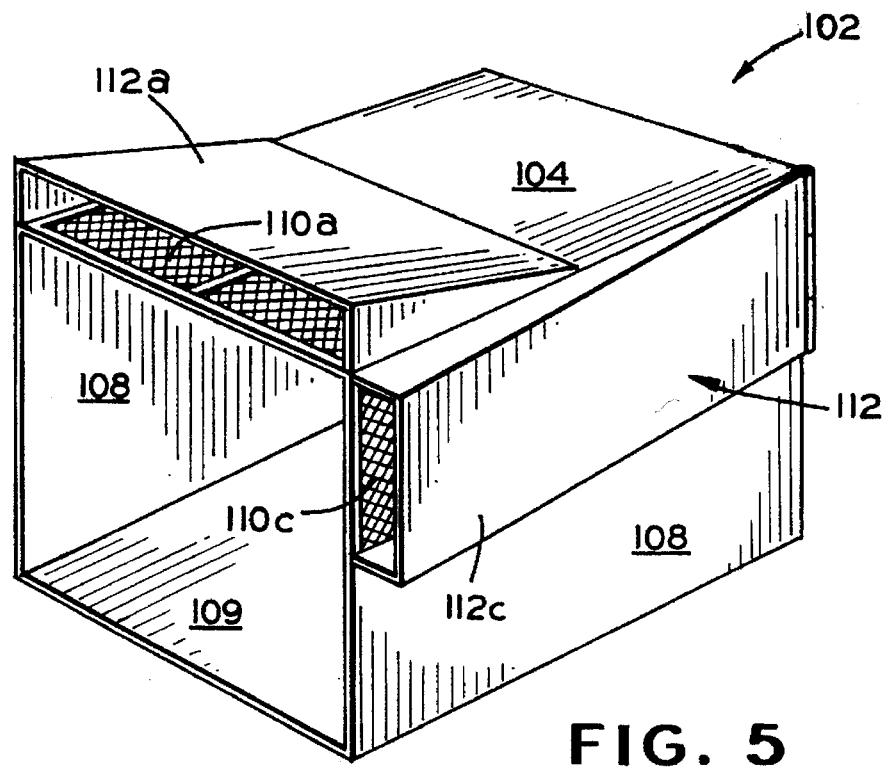
FIG. 5 is a perspective view of a fourth embodiment of the leaf collection box in accordance with this invention, with the rear wall removed.
Figure 6:
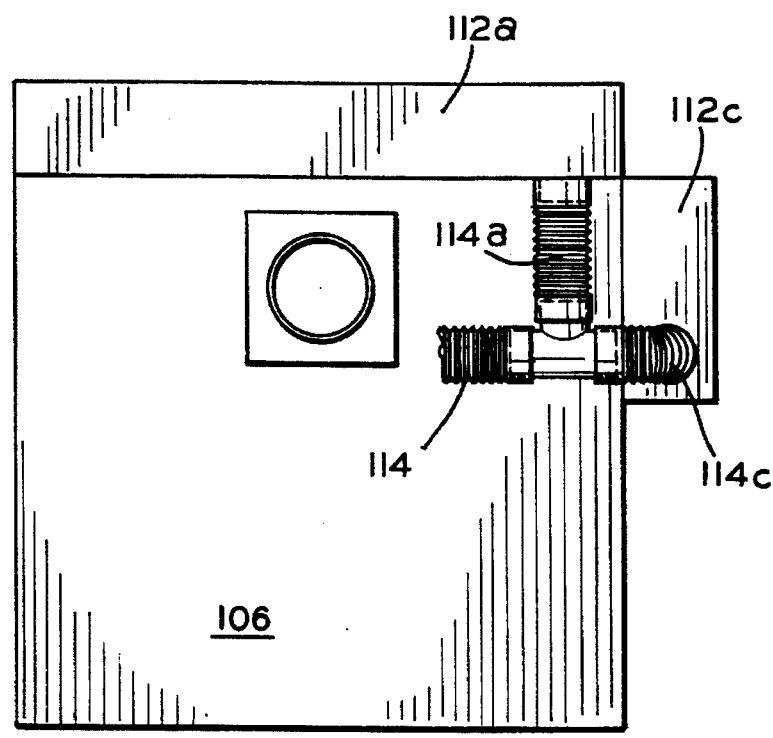
FIG. 6 is a rear elevational view of the rear wall of the leaf collection box of FIG. 5.

FIGS. 5 and 6 together illustrate a fourth embodiment of a leaf collection box, indicated generally at 102, in accordance with this invention. FIG. 5 is a view of the leaf collection box 102 with the rear wall removed, and FIG. 6 is a view of the rear wall. The leaf collection box 102 includes a top wall 104, a rear wall 106, and two side walls. The leaf collection box 102 also includes a front wall (not shown) and a bottom wall 109.

The leaf collection box 102 further includes two screened openings 110a and 110c for allowing passage of leaf dust and air from the leaf collection box 102, while retaining most of the whole leaves and large particles therein. In the embodiment shown in FIG. 5, the first screened opening 110a is provided in the top wall 104. The second screened opening 110c is provided in a side wall 108. More specifically, the side screened opening 110c is positioned in the top portion of the side wall 108 of the leaf collection box 102. However, unlike the embodiment illustrated in FIG. 4, the top screened opening 110a is not positioned in a side portion of the top wall 104. Rather, the top screened opening 110a is positioned in the rear portion of the top wall 104.

A dust shroud is indicated generally at 112. The dust shroud 112 includes a top shroud portion 112a, which covers the top screened opening 110a, and a side shroud portion 112c , which covers the side screened opening 110c. The side shroud portion 112c is hinged near the front of the leaf collection box 102 to allow opening and closing over the side screened opening 110c. However, unlike the embodiment illustrated in FIG. 4, the side shroud portion 112c is not interconnected with the top shroud portion 112a. FIG. 6 illustrates how leaf dust is passed from these areas for recirculation. A dust collection hose 114 divides into a top section 114a and a side section 114c. The top section 114a of the dust collection hose 114 is connected to the top shroud portion 112a, and the side section 114c of the dust collection hose 114 is connected to the side shroud portion 112c.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A leaf collection apparatus comprising:
    a vacuum generating apparatus for collecting leaves;
    a leaf collection box including a top wall, a rear wall, and a side wall for holding leaves connected to said vacuum generating apparatus, said leaf collection box including a screened opening in each of two of said walls;
    a dust shroud connected to said leaf collection box and covering said screened openings; and
    a recirculating means connecting said dust shroud to said vacuum generating apparatus so that leaf dust is removed from said dust shroud and recirculated to said vacuum generating apparatus.

2. The apparatus described in claim 1 wherein said two screened openings together comprise between about 25% and about 45% of the surface area of said two walls.

3. The apparatus described in claim 1 wherein said screens provide openings of about ¼ inch to ½ inch by about ¾ inch to 1 inch.

4. The apparatus described in claim 1 wherein said dust shroud includes interconnected first and second portions.

5. The apparatus described in claim 4 wherein said first and second portions are hinged to facilitate opening and closing over said screened openings.

6. The apparatus described in claim 1 wherein said leaf collection box includes a screened opening in said side wall and a screened opening in said rear wall.

7. The apparatus described in claim 1 wherein said leaf collection box includes a screened opening in said top wall and a screened opening in said rear wall.

8. The apparatus described in claim 7 wherein said dust shroud includes interconnected top and rear portions, and wherein said recirculating means is connected to said rear shroud portion.

9. The apparatus described in claim 7 wherein said top screened opening is positioned in the rear portion of said top wall, and said rear screened opening is positioned in the top portion of said rear wall.

10. The apparatus described in claim 7 wherein said vacuum generating apparatus includes a fan inside a housing.

11. The apparatus described in claim 10 wherein said vacuum generating apparatus includes a discharge robe connected between said fan housing and said leaf box, and wherein said rear screened opening is divided into two side sections with said discharge tube extending between said side sections into said leaf box.

12. The apparatus described in claim 1 wherein said vacuum generating apparatus includes a fan inside a housing.

13. The apparatus described in claim 12 wherein said vacuum generating apparatus includes a discharge tube connected between said fan housing and said leaf box.

14. The apparatus described in claim 1 wherein said vacuum generating apparatus includes an intake hose to facilitate picking up leaves from the ground.

15. The apparatus described in claim 1 wherein said recirculating means comprises a dust hose.

16. The apparatus described in claim 1 wherein said leaf collection box includes means for viewing the interior of said leaf collection box to determine the quantity of leaves.

17. A leaf collecting apparatus comprising:
    a vacuum generating apparatus for collecting leaves,
    a leaf collection box for holding leaves connected to said vacuum generating apparatus, said leaf collection box including a top wall, a rear wall, and a side wall, said leaf collection box including a screened opening in said top wall and a screened opening in said rear wall,
    a dust shroud including interconnected first and second portions connected to said enclosure and covering said screened openings, and
    a recirculating means connecting said dust shroud to said vacuum generating apparatus so that leaf dust is removed from said dust shroud and recirculated to said vacuum generating apparatus.

18. A leaf collection apparatus comprising:
    a vacuum generating apparatus for collecting leaves, said vacuum generating apparatus including a fan inside a housing,
    a leaf collection box for holding leaves connected to said vacuum generating apparatus, said leaf collection box including a top wall, a rear wall, and a side wall, said leaf collection box including a screened opening in said top wall and a screened opening in said rear wall, wherein said two screened openings together comprise between about 25% and about 45% of the surface area of said two walls, and wherein said screens provide openings of about ¼–½ inch by about ¾–1 inch,
    a dust shroud including interconnected first and second portions connected to said enclosure and covering said screened openings, and
    a dust hose connecting said dust shroud to said vacuum generating apparatus so that leaf dust is removed from said dust shroud and recirculated to said vacuum generating apparatus.

* * * * *